(12) United States Patent
Hakamata et al.

(10) Patent No.: US 6,889,788 B2
(45) Date of Patent: May 10, 2005

(54) FRAME ASSEMBLY FOR SCOOTER-TYPE VEHICLE

(75) Inventors: Takeo Hakamata, Shizuoka (JP); Shunichi Itajiki, Shizuoka (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 10/319,327

(22) Filed: Dec. 13, 2002

(65) Prior Publication Data

US 2003/0111283 A1 Jun. 19, 2003

(30) Foreign Application Priority Data

Dec. 14, 2001 (JP) ........................................ 2001-381851
Feb. 20, 2002 (JP) ........................................ 2002-042934
Oct. 4, 2002 (JP) ........................................ 2002-291982

(51) Int. Cl.$^7$ ................................................. B60K 1/00
(52) U.S. Cl. ...................................... 180/219; 180/292
(58) Field of Search .............................. 180/219, 291, 180/292, 295, 311, 312

(56) References Cited

U.S. PATENT DOCUMENTS

| | | | |
|---|---|---|---|
| 4,660,854 A | | 4/1987 | Suzuki et al. |
| 4,989,665 A | * | 2/1991 | Yamagiwa et al. ......... 164/363 |
| 6,073,719 A | * | 6/2000 | Ohmika et al. ............. 180/219 |
| 6,142,253 A | | 11/2000 | Mueller et al. |
| 6,397,964 B1 | * | 6/2002 | Yamauchi ................... 180/229 |
| 6,481,408 B2 | * | 11/2002 | Tsutsumikoshi ........ 123/195 R |
| 6,513,613 B2 | * | 2/2003 | Suzuki et al. ............... 180/227 |
| 6,547,023 B2 | * | 4/2003 | Laimbock ................... 180/227 |
| 6,612,391 B2 | * | 9/2003 | Yamauchi ................... 180/292 |
| 6,640,922 B2 | * | 11/2003 | Nakagawa ................... 180/227 |

FOREIGN PATENT DOCUMENTS

| | | |
|---|---|---|
| FR | 2 624 084 | 4/1987 |
| JP | 2520466 | 9/1996 |
| JP | 2001-10579 | 1/2001 |

OTHER PUBLICATIONS

Patent Abstracts of Japan; vol. 015, No. 441; Aug. 14, 1991; JP 03 186490.

* cited by examiner

Primary Examiner—Lesley D. Morris
Assistant Examiner—L. Lum
(74) Attorney, Agent, or Firm—Knobbe Martens Olson & Bear LLP

(57) ABSTRACT

A frame assembly for a scooter-type vehicle having at least one front wheel, at least one rear wheel and a vehicle body. The frame assembly includes a head tube, which supports a front wheel suspension assembly of the vehicle. An upper frame extends from the head tube to a rearward end of the vehicle body. A swingarm is pivotally supported by the upper frame and supports a rear wheel of the vehicle. The frame assembly may include a lower frame removeably coupled to the upper frame and defining a space therebetween. The lower frame preferably supports at least one component of the scooter-type vehicle in the space, such as a fuel tank, for example. In one arrangement, the upper frame includes a forward portion and a rearward portion. The rearward portion includes at least one elongated, channel-shaped frame member having a forward section and a rearward section. Preferably, the forward section has an open side facing in a lateral direction and the rearward section has an open side facing in a vertical direction.

18 Claims, 13 Drawing Sheets

FRAME ASSEMBLY FOR SCOOTER-TYPE VEHICLE

RELATED APPLICATIONS

This application is related to, and claims priority from, Japanese Patent Application Nos. 2001-381851, filed Dec. 14, 2001, 2002-042934, filed Feb. 20, 2002 and 2002-291982, filed Oct. 4, 2002, the entireties of which are expressly incorporated by reference herein.

BACKGROUND OF THE INVENTION

1. Field of the Invention

The present invention relates generally to vehicle frame assemblies. More particularly, the present invention relates to a frame assembly for a scooter-type vehicle.

2. Description of the Related Art

Scooter-type vehicles, or scooters, include a frame assembly, which usually supports a body of the scooter, along with front and rear wheels of the scooter. Typically, front and rear suspension assemblies are operatively positioned between the front and rear wheels and the frame assembly. The front suspension assembly commonly is a telescopic fork arrangement, while the rear suspension assembly is a swingarm-type arrangement. In a scooter, the rear suspension swingarm typically supports a power unit, which is configured to drive the rear wheel of the scooter. The power unit may include a torque-producing device, such as an internal combustion engine or electric motor, along with a transmission and final drive assembly, such as a drive shaft, drive belt, or chain and sprocket assembly, for example.

The frame assembly of a scooter-type vehicle is an elongate structure, which typically extends from a forward end to a rearward end of the scooter. A scooter frame assembly generally is convex in shape, as viewed from a side elevational view. A handlebar assembly and a seat assembly are supported at opposing ends of the frame assembly and a generally open area is defined therebetween. Accordingly, the open area between the handlebar assembly and the seat assembly allows the scooter to be easily straddled, or mounted, as opposed to a typical motorcycle, wherein a fuel tank occupies the space between the handlebar assembly and the seat assembly. Such an arrangement may be referred to as a "step-through" frame assembly.

Generally, a scooter frame assembly is constructed of a welded-up assembly of individual tubular members. Typically, a central portion of the frame assembly includes a pair of upper tubes, or rails, and a pair of lower tubes, or rails. The individual pairs of upper and lower rails usually are aligned with one another in a vertical direction and spaced from one another in a lateral direction, with the pair of upper rails being spaced above the pair of lower rails. Various large components of the scooter are housed within an internal space defined by the upper and lower rails. For example, a radiator and fuel tank of the scooter typically are supported within the space between the upper and lower rails. As a result of the welded-up construction of the frame assembly, assembly of the components within the space defined between the upper and lower rails is difficult. Accordingly, the overall cost of the scooter is increased due to the time required for assembly.

Furthermore, the frame assembly of a scooter-type vehicle is relatively long compared to that of a normal motorcycle because of the rearrangement of the components in order to achieve the step-through construction of the frame assembly. That is, typically the fuel tank and the engine are aligned in succession along a longitudinal central plane (length) of the scooter, between the front and rear wheels, as opposed to a typical motorcycle wherein the fuel tank is positioned above the engine. Because the frame generally is longer to accommodate both the fuel tank and engine, it must also be strengthened to resist lateral or torsional forces that may be applied to the vehicle while turning. In order to achieve a desired level of strength, the frame assembly of a scooter typically is constructed from relatively thick steel tubing, which results in the overall frame assembly being relatively heavy.

SUMMARY OF THE INVENTION

Accordingly, a need exists for a scooter-type vehicle frame assembly that has a desired level of strength and is lower in weight than previous scooter frame assemblies. In addition, a need exists for a scooter-type vehicle frame assembly that permits simpler and more efficient assembly of components to the frame assembly. In one arrangement, upper and lower frame portions are provided, wherein the lower frame portion is detachably coupled to the upper frame portion. Such an arrangement permits components to be assembled to the lower frame portion and upper frame portion, separately, before the upper and lower portions are coupled to one another. Accordingly, efficient assembly is facilitated because of the ease in which components may be assembled to the separate upper and lower frame portions.

One aspect of the present invention involves a scooter-type vehicle having at least one front wheel, at least one rear wheel, a vehicle body and a frame assembly. The frame assembly includes a head tube, an upper frame extending from the head tube to a rearward portion of the vehicle body, and a lower frame. The vehicle additionally includes a swingarm, which is pivotally supported by the upper frame. The swingarm supports the at least one rear wheel and a power unit, configured to drive the at least one rear wheel. The lower frame includes a forward end portion, a rearward end portion, and an intermediate portion extending between the forward and rearward end portions. The forward end portion and the rearward end portion of the lower frame are removably coupled to the upper frame. The lower frame is shaped such that the intermediate portion of the lower frame is spaced below the upper frame. The lower frame supports at least one component of the vehicle between the lower frame and the upper frame.

Another aspect of the present invention involves a scooter-type vehicle including at least one front wheel, at least one rear wheel, a vehicle body and a frame assembly. The vehicle body has a seat assembly and footrest portion. The frame assembly includes a head tube, an upper frame constructed of an aluminum alloy material and extending from the head tube to a rearward portion of the vehicle body, and a lower frame spaced below the upper frame. A forward end and a rearward end of the lower frame are removably coupled to the upper frame. The vehicle additionally includes a swingarm pivotably supported by the upper frame. The swingarm supports the at least one rear wheel and a power unit configured to drive the at least one rear wheel. The upper frame comprises a forward portion extending generally between the head tube and the footrest portion and a rearward portion extending generally rearward from the footrest portion. The forward portion of the upper frame includes a pair of laterally down tubes, each of the down tubes having a continuous outer wall defining an enclosed cross-sectional area. In one arrangement, the upper frame may include a front section and a rear section, wherein the front section includes at least one channel-shaped member having an open side facing a generally lateral direction and the rear section including at least one channel-shaped member having an open side facing a generally vertical direction.

Yet another aspect of the present invention involves a scooter-type vehicle including at least one front wheel, at least one rear wheel, a vehicle body and a frame assembly. A vehicle body includes a seat assembly and a footrest portion. The frame assembly includes a head tube, a longitudinally extending frame member constructed of an aluminum alloy material and extending from the head tube to a rearward portion of the vehicle body. The frame member includes a forward portion extending generally between the head tube and the foot rest portion and the rear portion extending rearward from generally the footrest portion. The forward portion of the frame member includes a pair of laterally spaced down tubes, each of the down tubes having a continuous outer wall defining an enclosed cross-sectional area. The rearward portion of the frame member includes a front section and a rear section, the front section including at least one channel-shaped member having an open side facing a generally lateral direction and the rear section including at least one channel-shaped member having an open side facing a generally vertical direction.

BRIEF DESCRIPTION OF THE DRAWINGS

These and other features, aspects and advantages of the present frame assembly are described in greater detail with reference to drawings of preferred embodiments, which are intended merely to illustrate, but not to limit, the present invention. The drawings comprise 15 figures.

DETAILED DESCRIPTION OF THE PREFERRED EMBODIMENT

Figure 1:
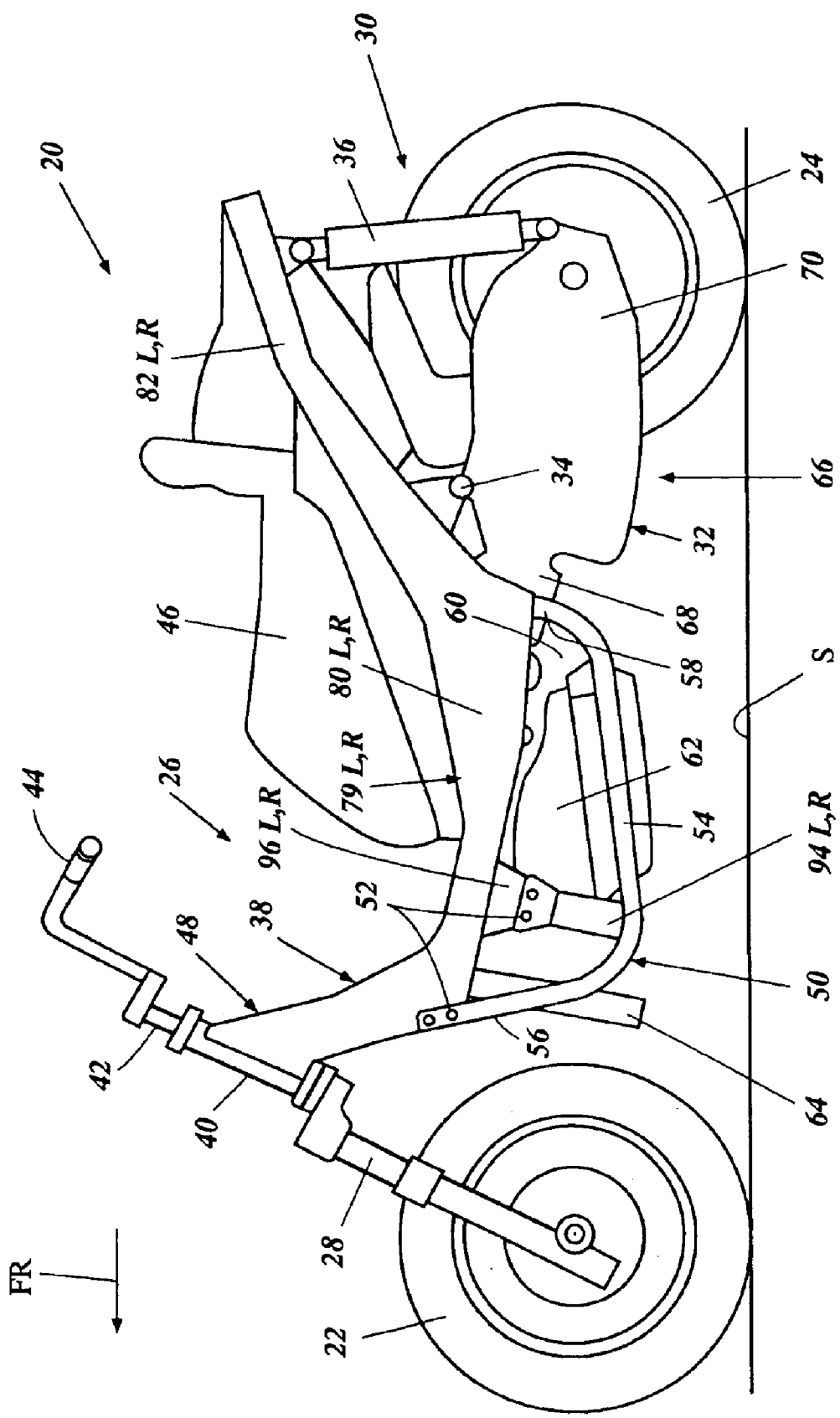
FIG. 1 is a side elevational view of a scooter-type vehicle employing a frame assembly having an upper frame portion and a removable, lower frame portion and being constructed in accordance with certain features, aspects and advantages of the present invention.

FIG. 1 illustrates a two-wheeled, straddle type scooter vehicle, or scooter, generally indicated by the reference numeral 20. Although the frame assembly of the present invention may be utilized on a wide variety of vehicles, the frame assembly is described in the context of a scooter 20 herein. Accordingly, a preferred embodiment of a scooter 20 will be described in general detail to assist the reader's understanding of a preferred embodiment of use of the present frame assembly.

Figure 2:
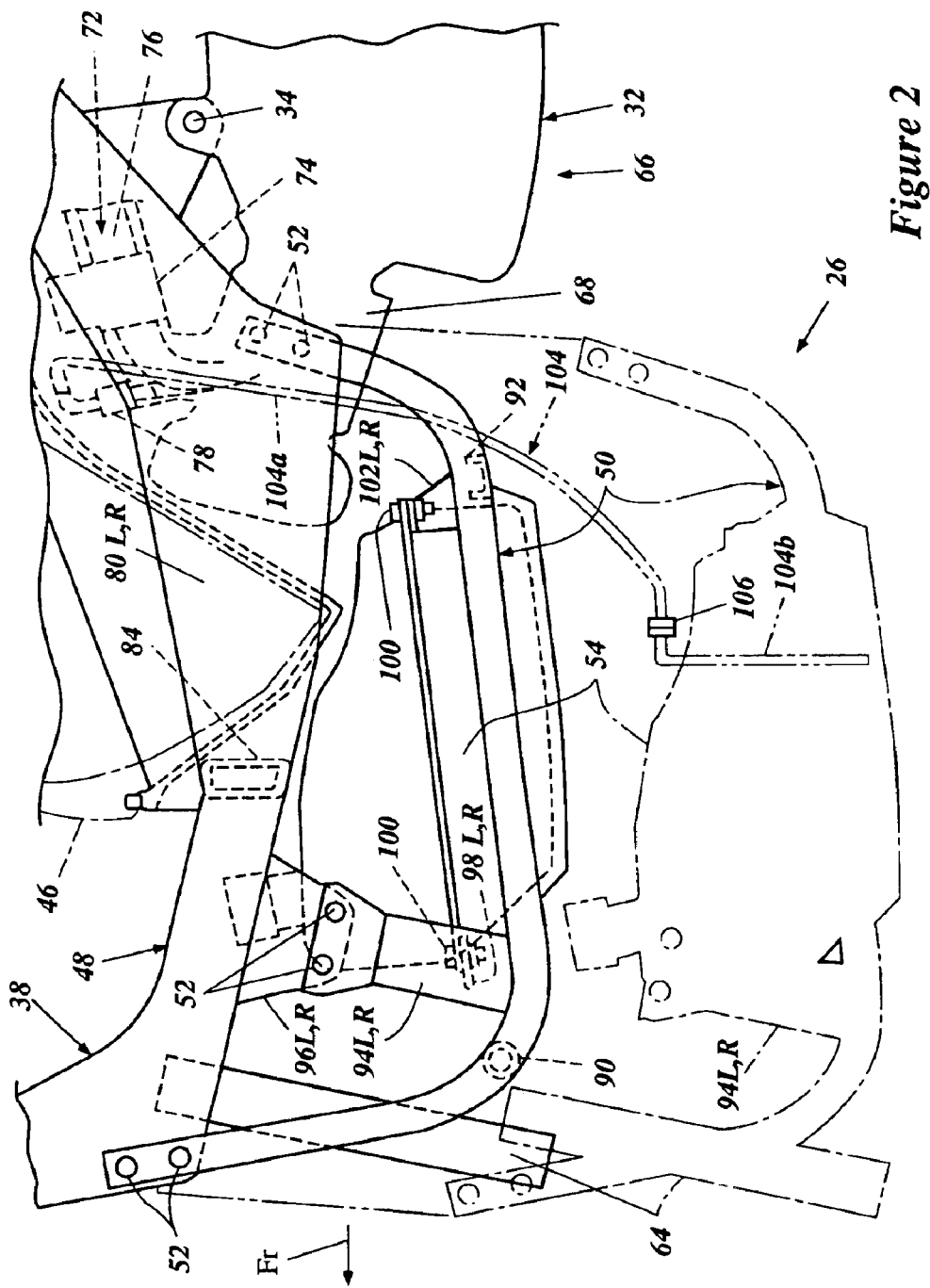
FIG. 2 is an enlarged view of the frame assembly of FIG. 1. The lower frame portion and components of the scooter, including a radiator and a fuel tank, are shown unassembled to the upper frame portion of the frame assembly in phantom.
Figure 3:
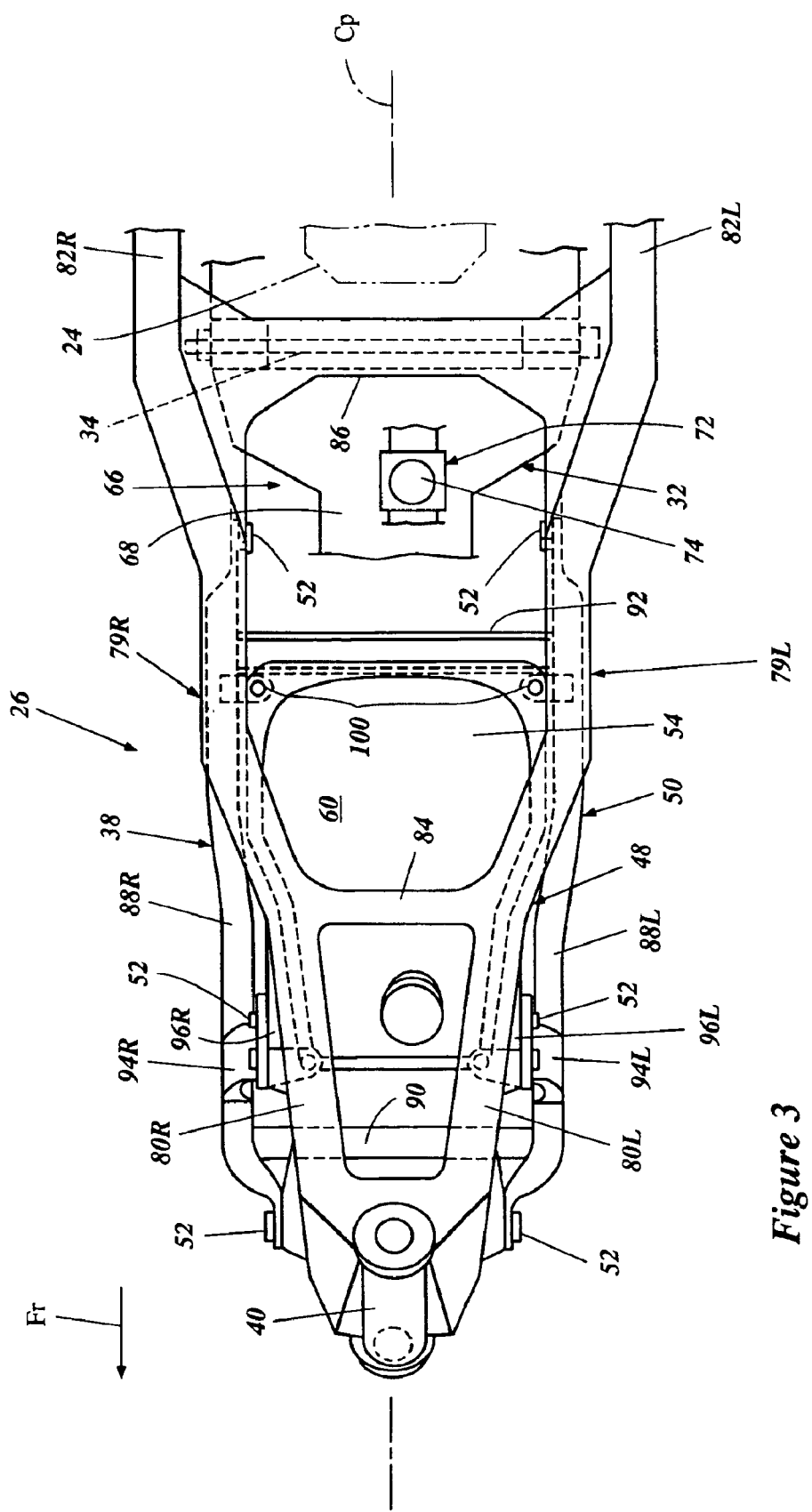
FIG. 3 is a top view of the frame assembly of the scooter of FIG. 1.

The scooter 20 will be described with reference to a coordinate system wherein a central, longitudinal plane $C_P$ (FIG. 3) passes vertically, lengthwise through the center of the scooter 20. A lateral plane is vertically-oriented and normal to the central plane $C_P$. Relative heights are expressed as elevations from a surface S (FIG. 1) upon which the scooter 20 rests. In FIGS. 1 through 3, an arrow $F_R$ indicates a direction of forward travel of the scooter 20. The terms "right" and "left" indicate right and the left directions from the perspective of a person sitting in a normal, forward-facing position on the scooter 20.

The scooter 20 includes, generally, a front wheel 22, a rear wheel 24, and a main body portion 26. Preferably, a front suspension assembly 28 and a rear suspension assembly 30 are interposed between the main body 26 and the front and rear wheels 22, 24, respectively. Thus, the front and rear wheels 22, 24 are permitted to move through a suspension-travel path in relation to the main body 26 in order to absorb bumps, or other irregularities, in the surface S upon which the scooter 20 operates.

Preferably, the front suspension assembly 28 is a telescopic fork arrangement, which permits the front wheel 22 to move in a relatively linear travel path, as is well known in the art. The rear suspension assembly 30, which preferably includes a swingarm 32, is pivotally supported relative to the main body 26 on a pivot 34. The rear wheel 24 is rotatably supported at a rear end of the swingarm 32 and moves in a generally arcuate travel path. A suspension element 36 extends between a rear end of the swingarm 32 and a rear end of the vehicle body 26 to provide a force tending to resist upward movement of the rear wheel 24. Preferably, the suspension element 26 is a shock absorber arrangement providing both a spring force and a damping force. However, other suitable suspension elements may also be used. Preferably, the swingarm 32 extends only along the left side of the rear wheel 24. That is, the swingarm 32 is of a single-sided construction.

The main body 26 of the scooter 20 includes a generally U-shaped frame assembly 38, which extends from a forward end toward a rearward end of the main body 26. In the illustrated arrangement, a central portion of the frame assembly 38 is lower than either of the forward or rearward ends to define a generally open central area, permitting "step-through" mounting of the scooter 20.

A forward end of the frame assembly 38 includes a head tube 40, which defines a steering axis of the scooter 20.

Desirably, the steering axis is canted slightly rearward from the vertical direction, as is well known in the art. A steering shaft 42 passes through the head tube 40 and is coupled to an upper end of the front suspension assembly 28. A handlebar assembly 44 is supported on an upper end of the steering shaft 42 to permit an operator of the scooter 20 to steer the front wheel 22 about the steering axis.

The frame assembly 38 supports a straddle-type seat assembly 46, on which a rider of the scooter 20 may sit. In addition, a central portion of the frame 38 desirably supports a pair of footrests (not shown) to support the feet of the rider of the scooter 20. Preferably, the footrests are positioned slightly forward and lower than the seat assembly 46 such that an operator of the scooter 20 may assume an upright, seated position with his or her feet resting on the footrests.

Desirably, the frame assembly 38 includes an upper frame 48 and a lower frame 50. Preferably, the lower frame 50 is removably coupled to the upper frame 48. In the illustrated arrangement, the lower frame 50 is removably coupled to the upper frame 48 by a plurality of fasteners, such as bolts 52. The lower frame includes a generally horizontal central portion 54, i.e., generally parallel to the surface S. Forward and rearward ends 56, 58, respectively, of the lower frame 50 curve in an upward direction from the central portion 54 and are coupled to the upper frame 48.

Accordingly, a space 60 is defined between the upper frame 48 and the central portion 54 of the lower frame 50. Desirably, at least one component of the scooter 20 is positioned within the space 60 and, preferably, is supported by the lower frame 50. In the illustrated arrangement, a fuel tank 62 and a radiator 64 are supported within the space 60 and are aligned in a longitudinal direction along the plane $C_P$. However, in alternative arrangements, other components of the scooter 20 may be positioned in the space 60 in addition, or alternative, to the fuel tank 62 and radiator 64. The frame assembly 38, including the upper frame 48 and lower frame 50, are described in greater detail below.

Preferably, a power unit 66 is supported by, or is formed integrally with, the swingarm 32. The power unit 66 includes, generally, an engine 68 and a power transmitting device 70. Preferably, the engine 68 is an internal combustion engine and may include any suitable number of cylinders and operate on any suitable principle, such as 2-cycle or 4-cycle operating principles, for example.

The power transmitting device 70 is configured to transmit power produced by the engine 68 to the rear wheel 24. The power transmitting device 70 may include a single speed or multiple speed transmission and may include a final drive of any suitable arrangement, such as a chain drive, a belt drive, or a shaft drive, as will be appreciated by one of skill in the art. In an alternative arrangement, the scooter 20 may be powered by an electric motor. In such an arrangement, the fuel tank 54 may be replaced by a battery and the engine 68 may be replaced by an electric motor.

The power unit 66 also includes a fuel and air supply system 72, which is configured to supply fuel and air to the engine 68. In the illustrated arrangement, the fuel supply system 72 includes a throttle valve 74, which controls a flow of air through an intake passage 76. The intake passage 76 communicates with a combustion chamber (not shown) of the engine 68. The fuel supply system 72 additionally includes a charge former configured to supply a charge of fuel to the combustion chamber. In the illustrated arrangement, the charge former is a fuel injector 78 that is positioned to deliver a charge of fuel to the intake passage 76. However, in other arrangements, the charge former may be configured to deliver a charge of fuel directly to the combustion chamber or, in some arrangements, the charge former may comprise a carburetor.

As described above, preferably, the frame assembly 38 includes an upper frame 48 and a lower frame 50. Desirably, the lower frame 50 is removably coupled to the upper frame 48 to permit an efficient assembly of the scooter 20. The upper frame 48 preferably includes right and left elongated frame members 79R, 79L, which extend from the head tube 40 toward a rear end of the vehicle body 26. Each of the right and left frame members is divided into a main frame portion 80R, 80L, which extends from the head tube 40 to generally a rear end 58 of the lower frame 50, and a seat frame portion 82R, 82L, which extends from a rearward end of the main frame portions 80R, 80L to a rear end of the vehicle body 26. Preferably, each of the upper frame members 79R, 79L is of a generally hollow, tubular construction and is generally rectangular in cross-section.

With reference to FIG. 3, the illustrated upper frame 48 also includes a first cross member 84 and a second cross member 86. The first and second cross members 84, 86 extend between the right and left frame members 79R, 79L. In the illustrated arrangement, the first cross member 84 extends between the main frame portions 80R, 80L, and the second cross member 86 extends between the seat frame portions 82R, 82L, to provide torsional rigidity to the upper frame 48. Preferably, the first and second cross members 84, 86 are generally hollow, rectangular cross-section members. FIG. 2 shows a cross-section view of the first cross member 84 in phantom. Preferably, the right and left frame members 79R, 79L, the first cross member 84 and the second cross member 86, are formed as a unitary structure from an aluminum material. Desirably, the upper frame 48 is constructed by a casting process, such as gravity casting or die casting, for example.

The illustrated lower frame 50 includes right and left elongated frame members 88R, 88L. A first cross member 90 and a second cross member 92 extend between the right and left frame members 88R, 88L of forward and rearward ends of the central portion 54 of the lower frame 50, respectively. With reference to FIG. 2, desirably the first cross member 90 is a hollow, tubular member, which is generally circular in cross-section. The second cross member 92 desirably is a channel shaped member, which has an open side facing in an upward direction.

Preferably, right and left stays 94R, 94L extend in an upward direction from a forward end of the central portion 54 of the right and left frame members 88R, 88L, respectively. Upper ends of the stays 94R, 94L are coupled to respective right and left flanges 96R, 96L, which extend in a downward direction from the upper frame 48. Preferably, the stays 94R, 94L are removably coupled to the flanges 96R, 96L by fasteners, such as bolts 52, to provide additional support to the central portion 54 of the lower frame 50. In a preferred arrangement, the lower frame 50 is constructed of welded-up members constructed from a steel material. Such an arrangement provides a desired amount of strength to protect the fuel tank 54 and other components within the main body 26 of the scooter 20.

As described above, desirably, the fuel tank 54 is coupled to the lower frame 50 and supported generally within the space 60 between the upper frame 48 and the lower frame 50. With reference to FIG. 2, specifically, the fuel tank 54 is coupled to right and left front supports 98R, 98L, which extend from the right and left stays 94R, 94L, respectively, by fasteners, such as bolts 100. In addition, a rearward end of the fuel tank 54 is coupled to right and left rear supports 102R, 102L, which extend from rearward ends of the central portion 54 of the right and left frame members 88R, 88L, by fasteners, such as bolts 100.

A fuel line 104 extends from the fuel tank 54 to the charge former 78 to supply fuel from the fuel tank 54 to the charge former 78 for introduction into the combustion chamber of the engine 68. To ease assembly, as described in greater detail below, the illustrated fuel line 104 is divided into an upper portion 104a and a lower portion 104b. The upper and lower portions 104a, 104b are connected by a coupler 106, which desirably is configured to permit the two portions 104a, 104b of the fuel line 104 to be quickly and securely interconnected.

As described above, the lower frame 50 desirably also supports the radiator 64. Preferably, the radiator 64 is positioned near the forward end 56 of the lower frame 50. In a preferred arrangement, the radiator 64 is mounted to the lower frame 50 such that a forward surface of the radiator 64 is canted rearwardly relative to the vertical direction. With such an arrangement, air flow above the front wheel 22 is directed by the upper frame 48 toward the forward surface of the radiator 64. The canted orientation of the front surface of the radiator 64 increases the amount of air flow through the radiator 64, to enhance its cooling capability.

As described above, the illustrated frame assembly 38 facilitates efficient assembly of the scooter 20. For example, in a preferred method of assembly, the front suspension assembly 28 and rear swingarm 32 are assembled to the upper frame 48 to form a first sub-assembly. Separately, at least one component is assembled to the lower frame 50 to form a second sub-assembly. Preferably, the at least one component includes the fuel tank 62 and the radiator 64. The first sub-assembly and the second sub-assembly are then assembled together with the fasteners 52. The two portions 104a, 104b of the fuel line 104 may be quickly coupled by the connector 106.

Advantageously, with such a method of assembly, components may be assembled to each of the upper frame 48 and the lower frame 50 without interference from other components. Accordingly, assembly of components, such as the swingarm 32, the fuel tank 62, and the radiator 64 to the frame assembly 38 is quicker and more efficient than assembly of components to frame assemblies of the prior art.

Additionally, because the fuel tank 62 is assembled to the lower frame 50 before the lower frame 50 is assembled to the upper frame 48, the size of the fuel tank 62 is not limited by the openings between the upper frame 48 and the lower frame 50, in an assembled condition. Because the empty fuel tank 62 (or a battery) is lighter than the engine 68, the lower frame 50 may be assembled to the upper frame 48 without requiring heavy lifting by a worker.

Furthermore, because both the front suspension assembly 28 (and the front wheel 22) and the rear swingarm 32 (and rear wheel 24) are assembled to the upper frame 48, the sub-assembly including the upper frame 48 may be self-supported on a work surface, such as an assembly line or a work place floor. With such an arrangement, the upper frame 48 is supported above the work surface by the front and rear wheels 22, 24, without the need for additional support structures. Accordingly, manufacturing costs may be reduced.

FIGS. 4–15 illustrate a scooter-type vehicle, or scooter, which is generally referred to by the reference numeral 110. The scooter 110 includes a modification of the frame assembly 38 of FIGS. 1–3 and is generally referred to by the reference numeral 112. The scooter 110 is similar in construction to the scooter 20 and includes a front wheel 114 and a rear wheel 116 supported relative to a main body 118 of the scooter 110 by front and rear suspension assemblies 120, 122. The front suspension assembly 120 comprises a telescopic, front fork arrangement and the rear suspension assembly 122 comprises a swingarm 124 pivotally supported by the frame 112. A rear shock absorber is connected between the frame 112 and the swingarm 124 to provide a force tending to resist upward movement of the swingarm 124.

The scooter 110 includes a handlebar assembly 128 coupled to an upper end of the front suspension assembly 120 to permit steering of the front wheel 114 by an operator of the scooter 110. A seat assembly 130 is supported by the main body 118 rearward of the handlebar assembly 128.

Figure 6:
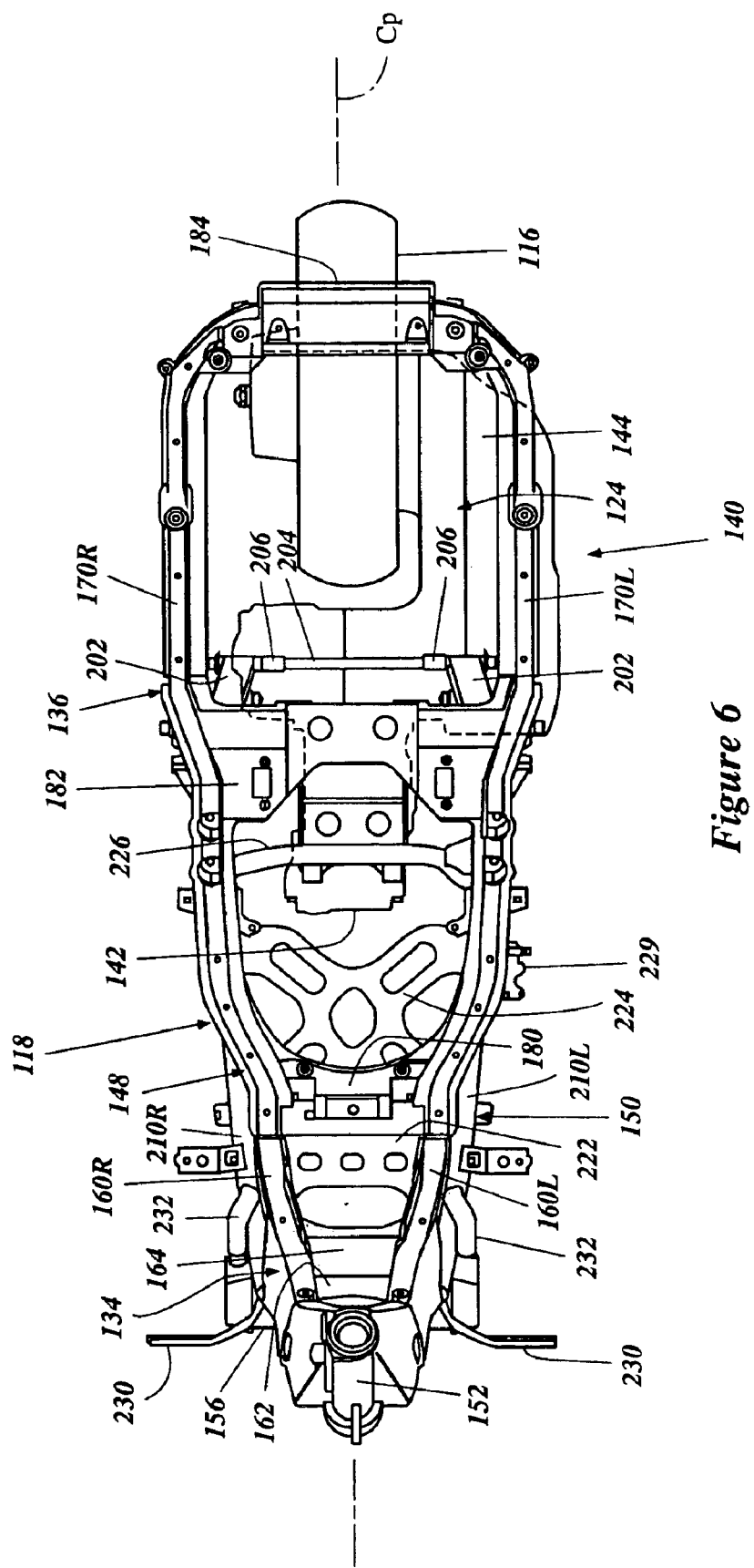
FIG. 6 is a top view of the frame assembly of the scooter of FIG. 4.

A pair of foot rests 132 are positioned generally between the handlebar assembly 128 and the seat assembly 130 and, preferably, at a position lower than the seat assembly 130. The foot rests 132 may be separate members on each side of the straddle-type seat assembly 130 or, alternatively, may comprise a single platform preferably extending on each side of a central plane $C_P$ of the scooter 110 (FIG. 6). The foot rests 132 generally divide the frame assembly 112 into forward and rearward portions 134, 136, respectively.

The scooter 110 also includes a cover, or cowling 138, which extends from a forward end toward a rearward end of the scooter 110. The cowling 138 preferably encloses a substantial portion of the frame assembly 112 to provide the scooter 110 with a pleasing outward appearance.

Similar to the scooter 20 of FIGS. 1–3, the scooter 110 of FIGS. 4–15 desirably includes a power unit 140 integrated with the swingarm 124. The power unit 140 preferably includes an engine 142 supported by, or integrated with, the swingarm 124. A transmission 144 supplies power from the engine 142 to the rear wheel 116. Preferably the transmission 144 is a V-belt automatic transmission supported by, or integral with, the swingarm 124. An air cleaner assembly 146 is mounted above the swingarm 124 and supplies filtered air to the engine 142 in a known manner. Desirably, the swingarm 124 extends only along the left side of the rear wheel 116 as illustrated in FIG. 6. Thus, the swingarm 124 is of a single sided construction in the illustrated arrangement. Other constructions are possible.

The frame assembly 112 preferably includes an upper frame 148 and a lower frame 150 removeably coupled to one another. The upper frame 148 extends from a head tube 152 toward a rearward end of the main body 118 of the scooter 110. The lower frame 150 is spaced below the upper frame 148 and, preferably, supports a fuel tank 154 and a radiator 156. Desirably, at least a portion of the fuel tank 154 is positioned within a space 158 defined between the upper frame 148 and the lower frame 150.

Figure 7:
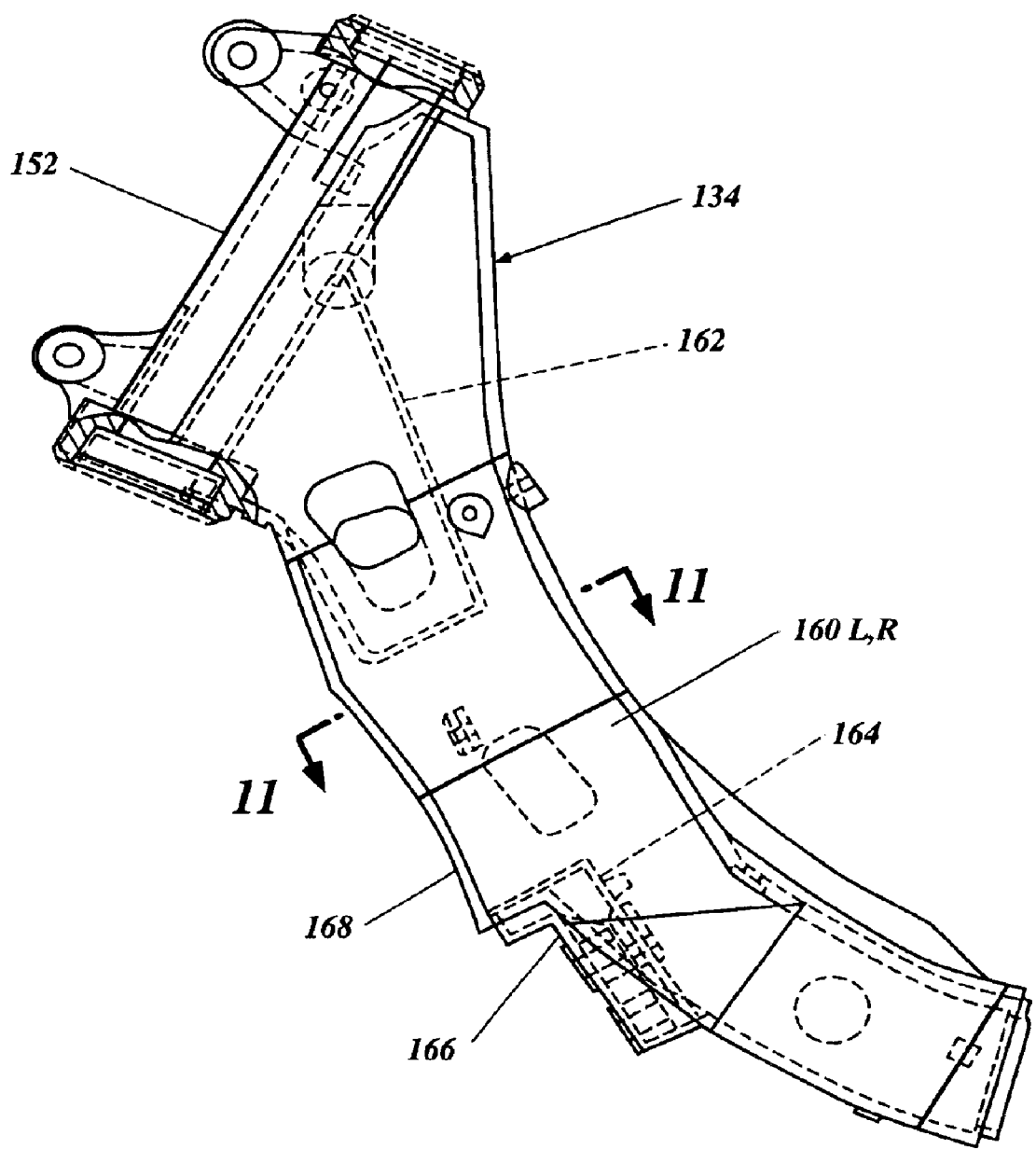
FIG. 7 is a side view of a front frame portion of the upper frame of the scooter of FIG. 4.
Figure 8:
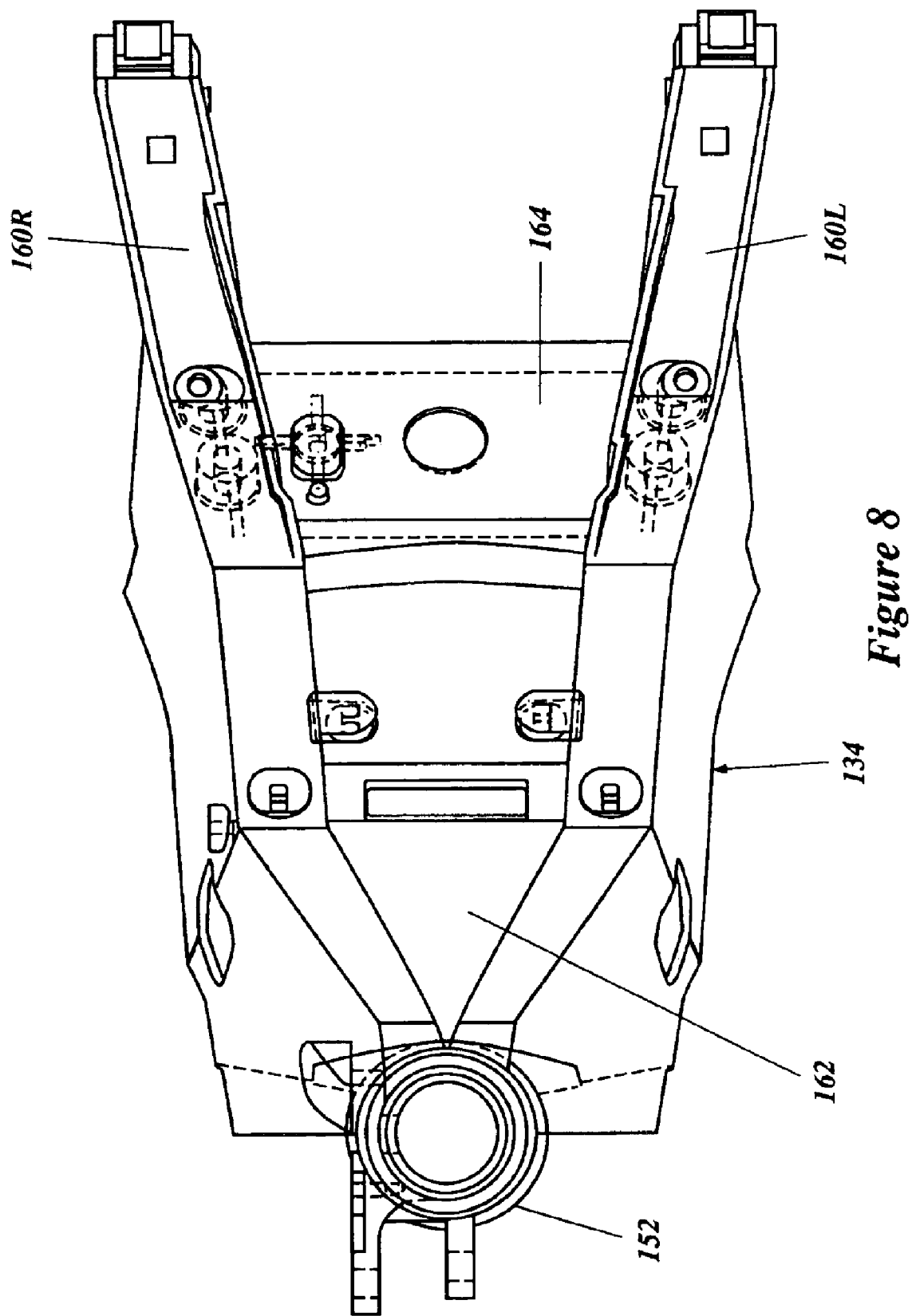
FIG. 8 is a top view of the front frame portion of FIG. 7.
Figure 11:
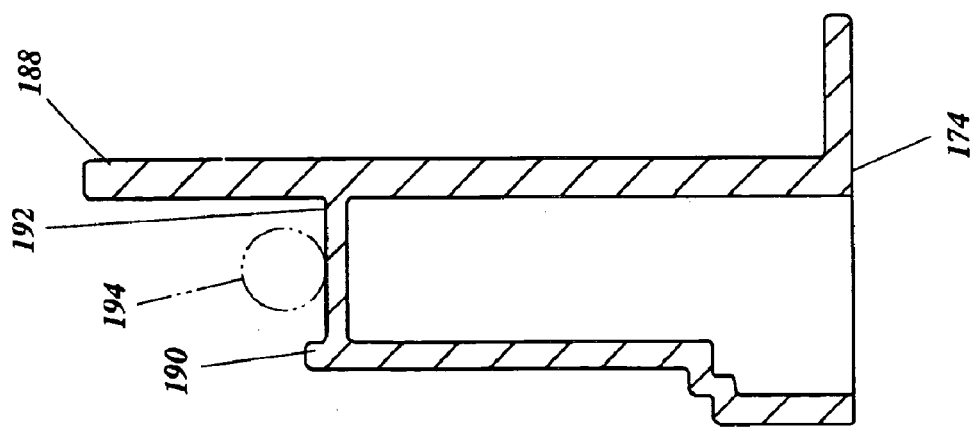
FIG. 11 is a cross-section view of a down tube member of the front frame portion of FIG. 7, taken along the line 11—11 of FIG. 7.

As described above, the foot rests 132 generally divide the upper frame 148 into a forward portion 134 and a rearward portion 136. With reference to FIGS. 7 and 8, preferably, the forward portion 134 includes the head tube 152 and right and left, laterally spaced down tubes 160R, 160L. The down tubes 160R, 160L extend in a downward direction from the head tube 152 and, preferably, are hollow members having a generally rectangular cross-section, as illustrated in FIG. 11.

A first cross member 162 and a second cross member 164 extend between the right and left down tubes 160R, 160L. In the illustrated embodiment, the first cross member 162 is positioned to a forward side of the second cross member 164. Desirably, the first cross member 162 is substantially rectangular in cross-section and the second cross member 164 is substantially L-shaped in cross-section. In the illustrated arrangement, the second cross member 164 also defines a pocket 166 for receiving a forward end of the lower frame 150, as described in greater detail below.

Preferably, a forward surface 168 of the forward portion 134 of the upper frame 148 is sized, shaped and positioned to direct a flow of air toward the canted, forward surface of the radiator 156, as described above in relation to the scooter 20 of FIGS. 1–3. In a preferred arrangement, the front portion 134 of the upper frame 148 is unitarily formed by a casting method, such as gravity casting, for example. Preferably, the forward portion 134 is constructed of an aluminum alloy material.

With reference to FIGS. 4–6, 9 and 10, the rear portion 136 of the upper frame 148 includes right and left, laterally spaced, elongated frame members 170R, 170L, each of which is divided into a forward section 172 and a rearward section 174. The rear portion 136 of the frame 112 preferably is unitarily formed by vacuum die casting in a mold having a first section 176a and a second section 176b (FIG. 9) corresponding with the forward section 172 and the rearward section 174 of the rear portion 136 of the upper frame 148, respectively.

Figure 12:
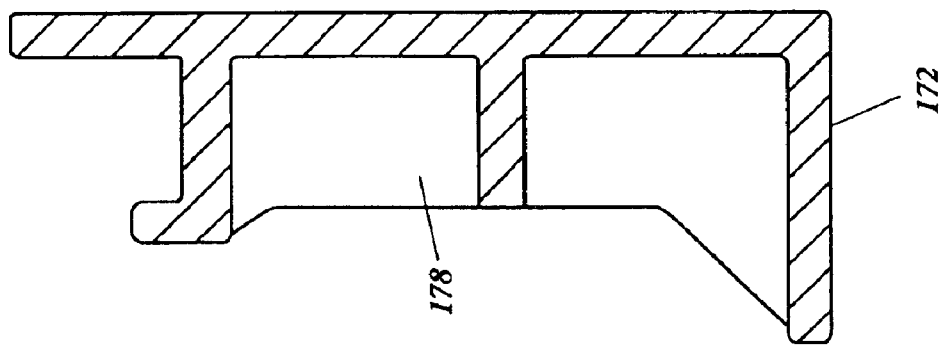
FIG. 12 is a cross-section view of a front section of a channel member of the rear frame portion of FIG. 9, taken along line 12—12 of FIG. 9.

Desirably, the forward section 176a of the mold includes two mold halves, which separate from one another in a lateral direction. Accordingly, each forward section 172 of the elongated frame members 170R, 170L may be formed as channel-shaped members having an open side facing in a lateral direction. In the illustrated frame 112, the open side of the forward section 172 of the frame members 170R, 170L face outwardly, as shown in FIG. 12.

Figure 13:
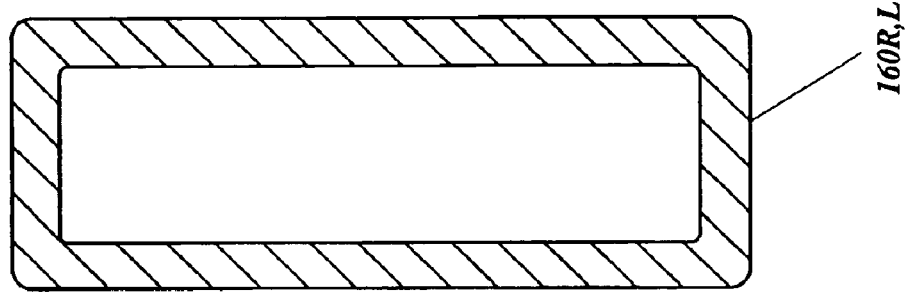
FIG. 13 is a cross-section view of a rear section of the channel member of FIG. 9, taken along the line 13—13 of FIG. 9.

The rearward portion 176b of the mold preferably includes a pair of mold halves which separate from one another in a vertical direction such that the rearward section 174 of each elongated frame member 170R, 170L may be formed as a generally channel-shaped member having an open side facing in a vertical direction. Preferably, the open side faces a downward direction, as shown in FIG. 13. In a preferred arrangement, the rear portion 136 of the upper frame 148 is constructed from an aluminum alloy material.

Once formed, preferably, the rear portion 136 of the upper frame 148 is welded to the forward portion 134. Advantageously, with the varied cross-sections of the upper frame 148, as shown in FIGS. 11–13, individual portions of the upper frame 148 possess desirable properties for distinct loading conditions that occur along distinct portions of the upper frame. For example, the enclosed cross-section of the forward portion 134 provides high strength in the high stress, forward area of the upper frame 148, which received high loads as a result of supporting the front suspension assembly 120.

The forward section 172 of the rear portion 136 of the upper frame 148 is configured to provide resistance to lateral, or torsional loads, such as those that may be encountered when the scooter 110 is turning. To further increase the resistance of the forward section 172 from bending in response to lateral forces, strengthening ribs 178 may also be provided. Preferably, the strengthening ribs 178 are provided in an X-shaped pattern in plan view and extend from an upper wall to a lower wall of the channel-shaped forward section 172.

The rearward section 174 of the upper frame 148 is configured to resist deformation in response to forces in a vertical direction, such as those applied to the upper frame 148 by the rear shock absorber 126. Accordingly, with an upper frame 148 constructed substantially as described above, the frame assembly 112 is configured to provide desirable strength characteristics, which vary along its length, to correspond with the different loading conditions that may be expected at different points along the length of the frame 148. Therefore, the upper frame 148 may be constructed with a minimum amount of a relatively lightweight material to reduce the overall weight of the scooter 110.

Desirably, a plurality of cross members extend between the elongated members 170R, 170L of the rear portion 136 of the upper frame 148. In the illustrated arrangement, a first cross member 180, a second cross member 182, and a third cross member 184 extend between the right and left elongated frame members 170R, 170L from a forward to a rearward end of the rearward portion 136 of the upper frame 148. Desirably, a rearward surface 180a of the first cross member and a forward surface 182a of the second cross member 182 are generally curved away from one another to define an enlarged space 186 therebetween. The space 186 may be utilized to provide a storage compartment for storage of objects such as a safety helmet, for example. The third cross member 184 desirably includes a channel shaped central portion with an open side facing upward, which may be configured to store a battery, or other component of the scooter 110.

With reference to FIG. 13, desirably, an inner wall 188 of the rearward section 174 of the elongated frame members 170R, 170L is taller than an outer wall 190 of the rearward section. Preferably, a side wall 192 of the rearward section 174, along with the inner wall 188 and the outer wall 190, defines a channel 192 in which one or more electrical wires 194, or hoses, may be routed.

Figure 9:
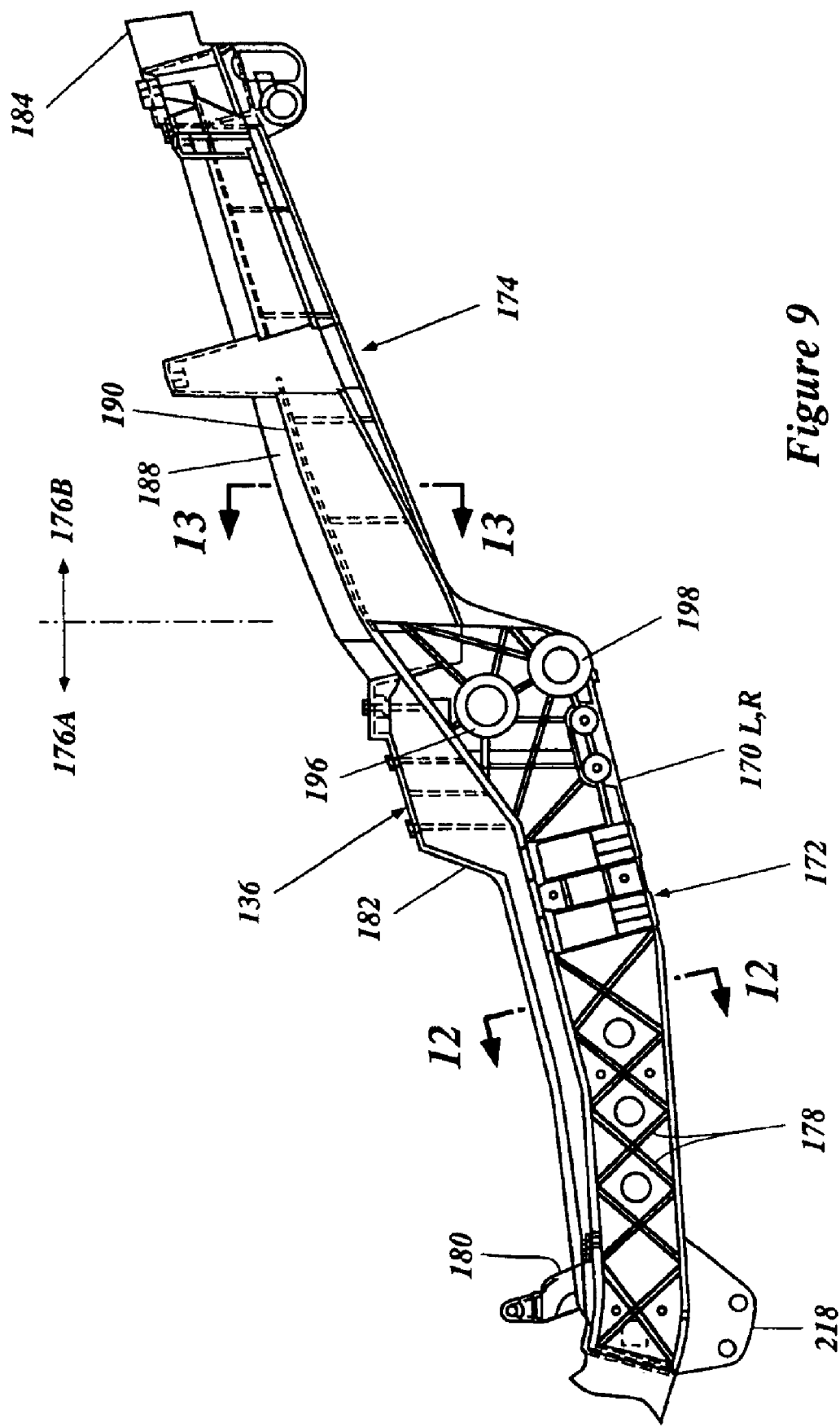
FIG. 9 is a side view of a rear frame portion of the upper frame of the scooter of FIG. 4.
Figure 10:
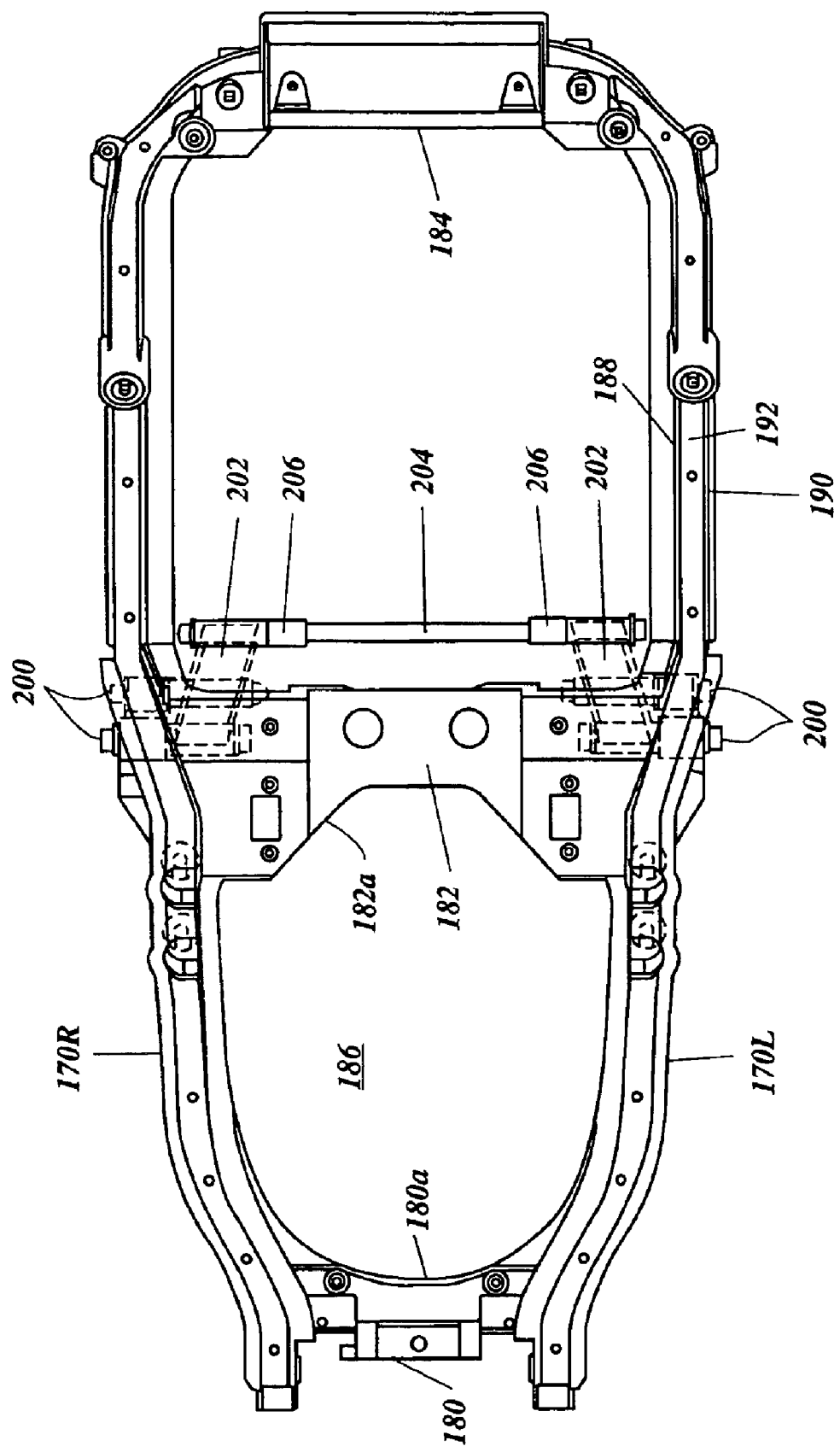
FIG. 10 is a top view of the rear frame portion of FIG. 9.

As described above, preferably the swingarm 124 is pivotally supported by the upper frame 148. With reference to FIGS. 6, 9 and 10, each elongated member 170R, 170L of the upper frame 148 includes a pair of bosses 196, 198, which support shafts 200. The shafts 200, in turn, support downwardly extending brackets 202. A shaft 204 passes through bosses 206 of the swingarm 124 and is supported by lower ends of the brackets 202. Thus, the swingarm 124 is pivotally supported relative to the upper frame 148 to pivot about an axis defined by the shaft 204. Preferably, resilient damper members are interposed between the shafts 200 and the bosses 196, 198 of the upper frame 148 to attenuate vibrations from being transferred to the upper frame 148 and, thus, the seat assembly 130.

Figure 14:
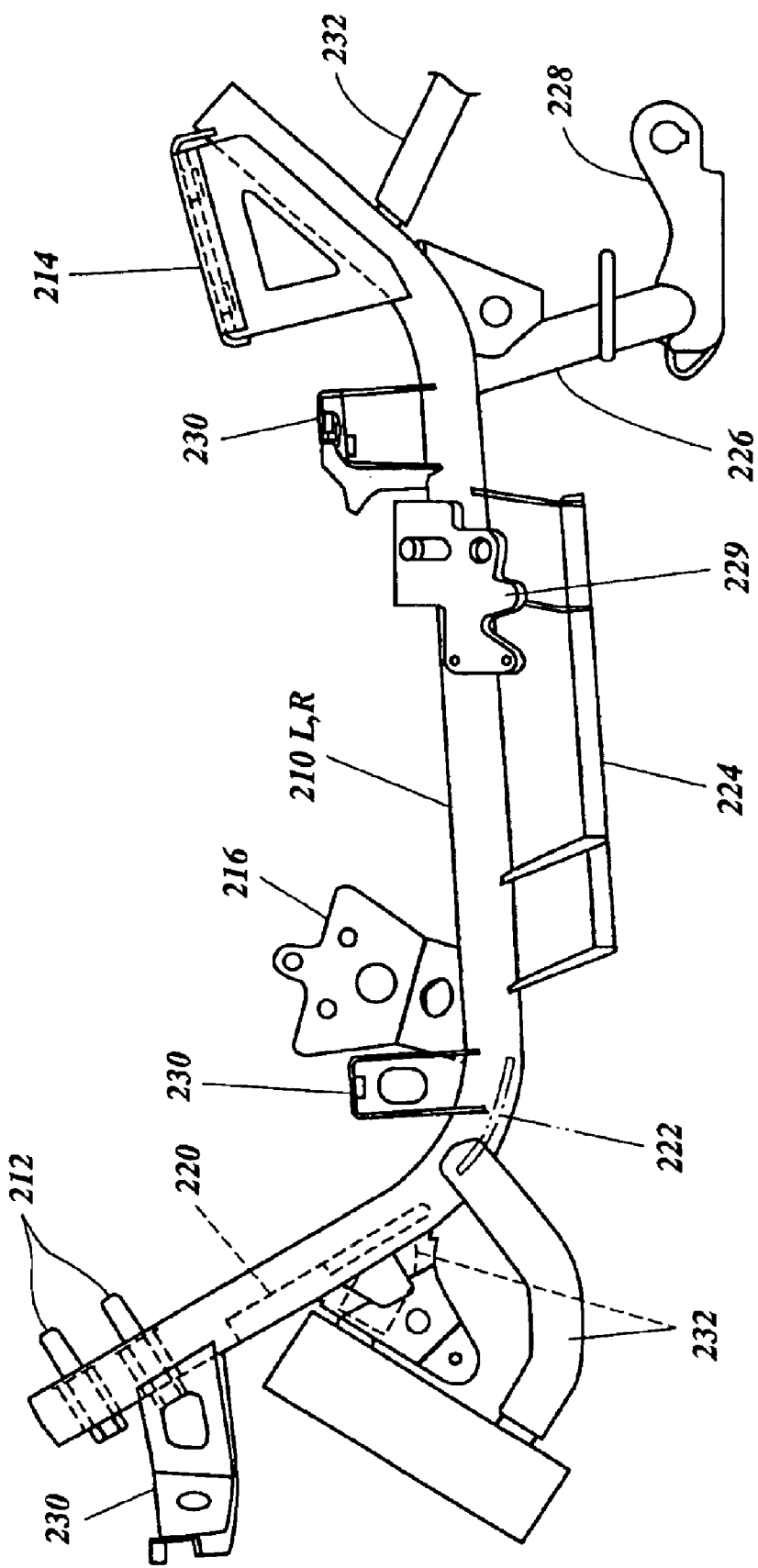
FIG. 14 is a side view of the lower frame portion of the scooter of FIG. 4, removed from the upper frame portion of the frame assembly.
Figure 15:
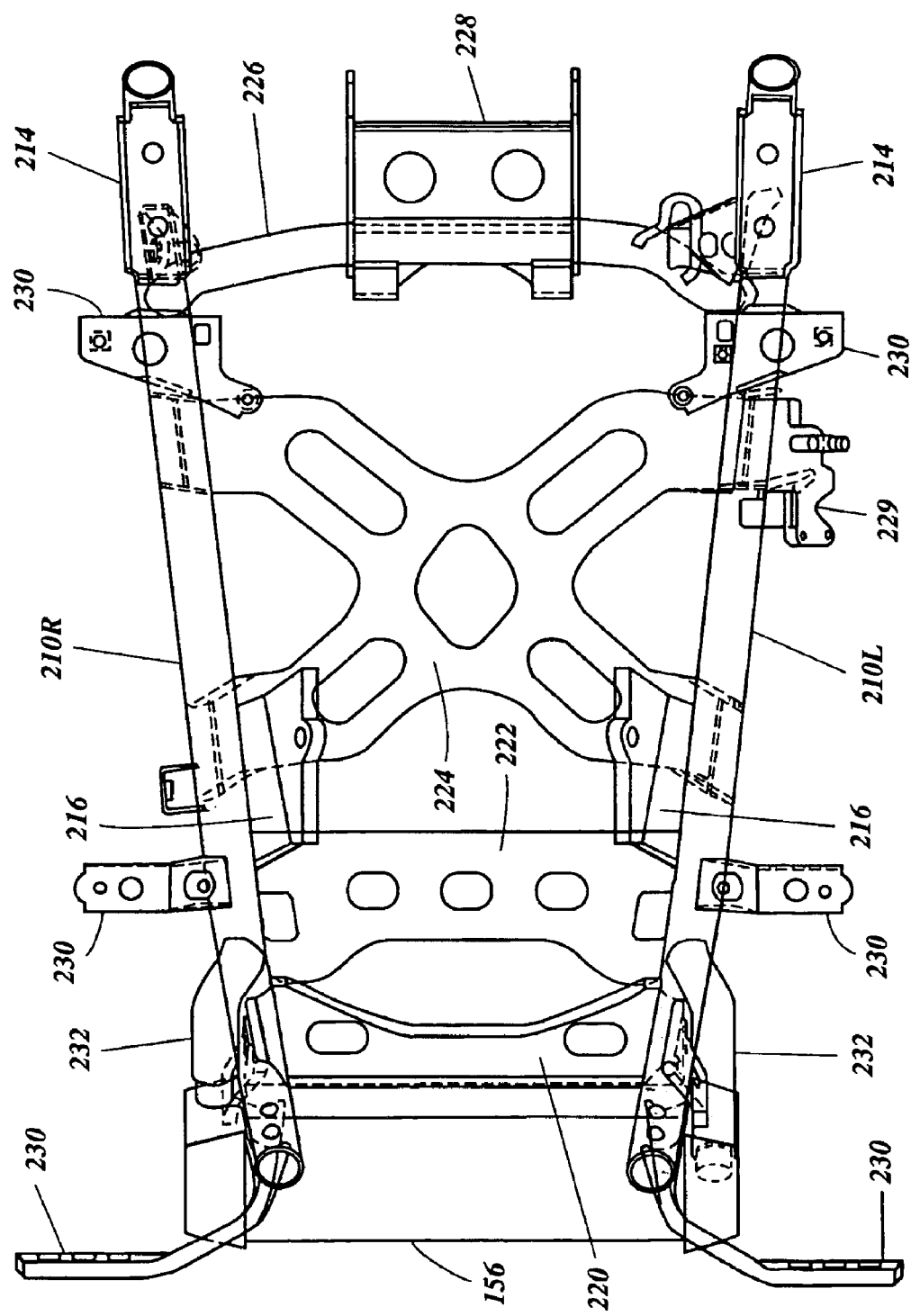
FIG. 15 is a top view of the lower frame portion of FIG. 14.

With reference to FIGS. 14 and 15, preferably, the lower frame 150 is a welded-up, tubular structure, which is constructed from a steel material to provide high strength. Desirably, the lower frame 150 includes right and left, laterally spaced, elongated frame members 210R, 210L, respectively. Preferably, the lower frame 150 is removeably connected to the upper frame 148 at a forward end, a rearward end and an intermediate portion.

Specifically, in the illustrated arrangement, a forward end of the lower frame 150 is received in the pocket 166 of the forward portion 134 of the upper frame 148 and is releasably coupled to the upper frame 148 by one or more fasteners, such as bolts 212. Preferably, a connecting bracket 214 is welded to the rearward end of each of the elongated frame members 210R, 210L. The connecting brackets 214 are connected to the upper frame 148 by one or more fasteners, such as bolts 212, to couple the rear end of the lower frame 150 to the upper frame 148. Desirably, a connecting plate 216 extends in an upward direction from a central portion of each elongated frame member 210R, 210L and is coupled to a downwardly extending bracket 218 of the upper frame 148 by fasteners, such as bolts 212.

A plurality of cross members extend between the elongated frame members 210R, 210L. Specifically, a first cross member 220, a second cross member 222, a third cross member 224, and a fourth cross member 226 extend between the elongated frame members 210R, 210L and are spaced from a forward end to a rearward end thereof. Preferably, the first and second cross members 220, 222 extend between a generally forward end portion of the elongated frame members 210R, 210L and are generally plate-like members. The third cross member 224 is substantially X-shaped in top plan view and includes a plate-like central portion which is positioned below the central portion of the elongated frame members 210R, 210L. Desirably, the third cross member 224 supports the fuel tank 154 of the scooter 110. The fourth cross member 226 preferably is a tubular member having a circular cross-section. A central portion of the fourth cross member 226 is positioned below the elongated frame members 210R, 210L. The central portion of the fourth cross member 226 desirably supports a bracket 228 which, in turn, supports a center stand of the scooter 110. In addition, a bracket 229 is provided on the left elongated frame member 210L and is configured to support a side stand of the scooter 110.

Figure 4:
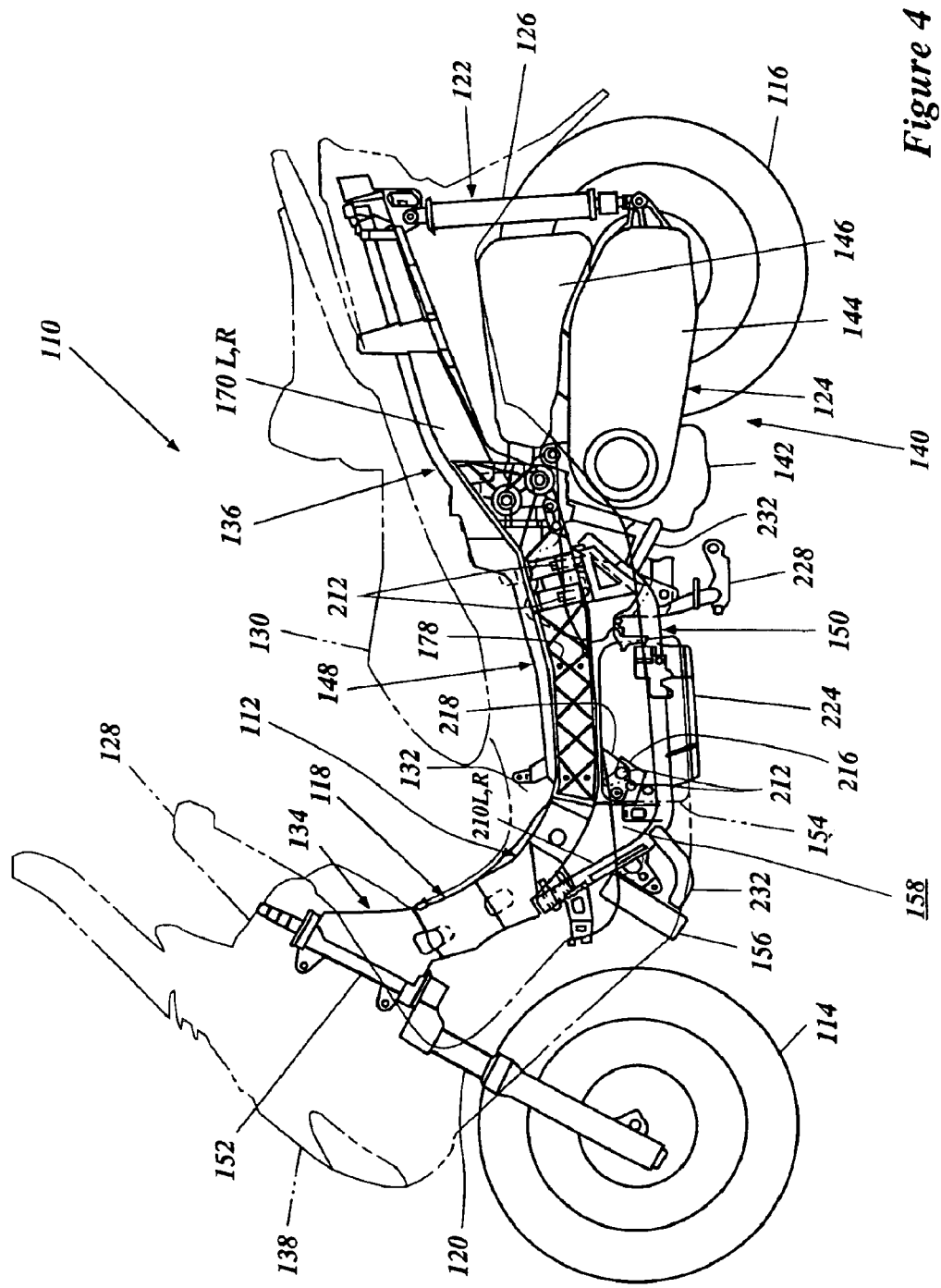
FIG. 4 is a side elevational view of a scooter-type vehicle employing a modification of the frame assembly of FIG. 1, including an upper frame portion and a lower frame portion.
Figure 5:
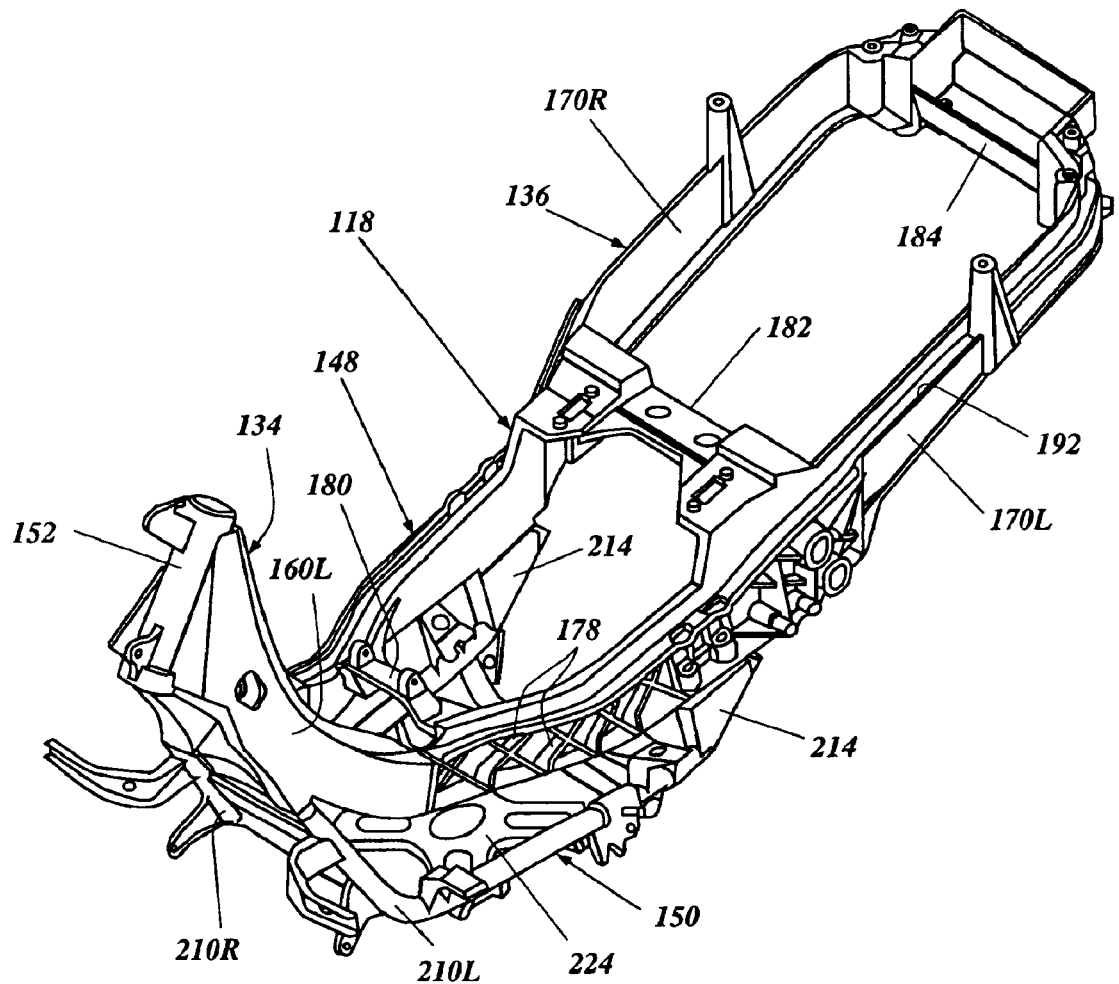
FIG. 5 is a perspective view of the frame assembly of the scooter of FIG. 4, with the components of the scooter being removed therefrom.

Preferably, a plurality of stays 230 are welded to the lower frame 150 and are configured to support the cover, or cowling 138, of the scooter 110 (FIG. 4). In the illustrated arrangement, a pair of stays 230 are provided on right and left sides of a forward end, an intermediate portion, and a rearward end of each of the elongated frame members 210R, 210L.

As described above, preferably, the lower frame 150 supports the radiator 156. The radiator 156 is configured to receive warmed cooling fluid from the engine 142, reduce the temperature of the cooling fluid, and return the cooled cooling fluid to the engine 142, in a known manner. Desirably, the elongated frame members 210R, 210L define a portion of cooling passages between the radiator 156 and the engine 142. Fluid conduit members, or hoses 232, extend between openings in the elongated frame members 210R, 210L and the radiator 156 and the engine 142, respectively. Stops, or plugs, (not shown) may be provided within the elongated frame members 210R, 210L, at a position downstream of the fluid hoses 232, to prevent leaking of cooling fluid from the ends of the elongated members 210R, 210L.

Advantageously, the frame assembly 112 of the scooter 110 of FIGS. 4–15 is assembled in a similar manner to the scooter 20 of FIGS. 1–3. Accordingly, the same advantages described above in relation to the scooter 20 of FIGS. 1–3 may be achieved with the frame assembly 112 of the scooter 110. In addition, the construction of the upper frame 148, as described above, provides a frame assembly 112 having desirable strength properties throughout the length of the frame assembly 112. Accordingly, the upper frame 148 may be made of a relatively lightweight material, such as an aluminum alloy, while providing a desirable level of strength.

Although the present invention has been described in the context of preferred embodiments, modifications apparent to those of skill in the art may be made without departing from the spirit and scope of the present invention. Accordingly, the invention is intended to be defined only by the claims that follow.

What is claimed is:

1. A vehicle comprising at least one front wheel, at least one rear wheel, a vehicle body and a frame assembly, the frame assembly comprising a head tube, an upper frame extending from the head tube to a rearward portion of the vehicle body, and a lower frame, the vehicle additionally comprising a swingarm pivotally supported by the upper frame, the swingarm supporting the at least one rear wheel and a power unit configured to drive the at least one rear wheel, wherein the lower frame includes a forward end portion, a rearward end portion and an intermediate portion extending between the forward and rearward end portions, the forward end portion and the rearward end portion of the lower frame being removeably coupled to the upper frame, the lower frame being shaped such that the intermediate portion of the lower frame is spaced below the upper frame, the lower frame supporting at least one component of the vehicle between the lower frame and the upper frame, wherein the at least one component comprises a fuel tank.

2. A vehicle comprising at least one front wheel, at least one rear wheel, a vehicle body and a frame assembly, the frame assembly comprising a head tube, an upper frame extending from the head tube to a rearward portion of the vehicle body, and a lower frame, the vehicle additionally comprising a swingarm pivotally supported by the upper frame, the swingarm supporting the at least one rear wheel and a power unit configured to drive the at least one rear wheel, wherein the lower frame includes a forward end portion, a rearward end portion and an intermediate portion extending between the forward and rearward end portions, the forward end portion and the rearward end portion of the lower frame being removeably coupled to the upper frame, the lower frame being shaped such that the intermediate portion of the lower frame is spaced below the upper frame, the lower frame supporting at least one component of the vehicle between the lower frame and the upper frame, wherein the at least one component comprises a fuel tank and a radiator.

3. A method of assembling the vehicle of claim 2, comprising assembling the at least one front wheel to the upper frame, assembling the at least one rear wheel and the swingarm to the upper frame, assembling the fuel tank and the radiator to the lower frame, and assembling the lower frame to the upper frame.

4. A method of assembling the vehicle of claim 2, comprising assembling the power unit to the swingarm, assembling the fuel tank and the radiator to the lower frame, assembling at least one fuel line between the fuel tank and the power unit, assembling at least one coolant line between the radiator and the power unit, assembling the lower frame to the upper frame, and assembling the swingarm to the upper frame.

5. A vehicle comprising at least one front wheel, at least one rear wheel, a vehicle body and a frame assembly, the frame assembly comprising a head tube, an upper frame extending from the head tube to a rearward portion of the vehicle body, and a lower frame, the vehicle additionally comprising a swingarm pivotally supported by the upper frame, the swingarm supporting the at least one rear wheel and a power unit configured to drive the at least one rear wheel, wherein the lower frame includes a forward end portion, a rearward end portion and an intermediate portion extending between the forward and rearward end portions, the forward end portion and the rearward end portion of the lower frame being removeably coupled to the upper frame, the lower frame being shaped such that the intermediate portion of the lower frame is spaced below the upper frame, the lower frame supporting at least one component of the vehicle between the lower frame and the upper frame, wherein the power unit comprises a cooling system, the lower frame defining at least a portion of a coolant passage.

6. A vehicle comprising at least one front wheel, at least one rear wheel, a vehicle body and a frame assembly, the vehicle body having a seat assembly and a footrest portion, the frame assembly comprising a head tube, an upper frame constructed of an aluminum alloy material and extending from the head tube to a rearward portion of the vehicle body, and a lower frame spaced below the upper frame, a forward end and a rearward end of the lower frame being removeably coupled to the upper frame, the vehicle additionally comprising a swingarm supported by the upper frame, the swingarm supporting at least one rear wheel and a power unit configured to drive the at least one rear wheel, wherein the upper frame comprises a forward portion extending generally between the head tube and the footrest portion and a rearward portion extending generally rearward from the footrests portion, the forward portion of the upper frame comprising a pair of laterally spaced lower tubes, each of the lower tubes having a continuous outer wall defining an enclosed cross-sectional area, wherein the rearward portion of the upper frame comprises a front section and a rear section, the front section comprising at least one channel-shaped member having an open side facing a generally lateral direction, the rear section comprising at least one channel-shaped member having an open side facing a generally vertical direction.

7. The vehicle of claim 6, wherein the front section of the rearward portion of the upper frame includes a plurality of reinforcing ribs extending between opposing side walls of the at least one channel-shaped member.

8. The vehicle of claim 7, wherein the plurality of reinforcing ribs are separated into pairs, wherein the individual ribs of each of the pairs are oriented generally perpendicular to, and intersect, one another.

9. The vehicle of claim 6, wherein the rearward portion of the upper frame is formed by a mold having a front mold section and a rear mold section for forming the front section and the rear section of the rearward portion of the upper frame, respectively, the front mold section having at least two mold portions that separate from one another in a lateral direction with respect to the rearward portion of the upper frame, and the rear mold section having at least two mold portions that separate from one another in a vertical direction with respect to the rearward portion of the upper frame.

10. The vehicle of claim 9, wherein the rearward portion of the upper frame is formed by a vacuum die casting process.

11. A method of assembling the vehicle of claim 6, comprising assembling the at least one front wheel to the upper frame, assembling the at least one rear wheel and the swingarm to the upper frame, assembling a fuel tank and a radiator to the lower frame, and assembling the lower frame to the upper frame.

12. A method of assembling the vehicle of claim 6, comprising assembling the power unit to the swingarm, assembling a fuel tank and a radiator to the lower frame, assembling at least one fuel line between the fuel tank and the power unit, assembling at least one coolant line between the radiator and the power unit, assembling the lower frame to the upper frame, and assembling the swingarm to the upper frame.

13. The vehicle of claim 6, wherein the power unit comprises a cooling system, the lower frame supporting a radiator and defining at least a portion of a coolant passage.

14. A vehicle comprising at least one front wheel, at least one rear wheel, a vehicle body and a frame assembly, the vehicle body having a seat assembly and a footrest portion, the frame assembly comprising a head tube, a longitudinally extending frame member constructed of an aluminum alloy material and extending from the head tube to a rearward portion of the vehicle body, wherein the frame member comprises a forward portion extending generally between the head tube and the footrest portion and a rearward portion extending rearward from generally the footrest portion, the forward portion of the frame member comprising a pair of laterally spaced lower tubes, each of the lower tubes having a continuous outer wall defining an enclosed cross-sectional area, and the rearward portion of the frame member comprises a front section and a rear section, the front section comprising at least one channel-shaped member having an open side facing a generally lateral direction, the rear section comprising at least one channel-shaped member having an open side facing a generally vertical direction.

15. The vehicle of claim 14, wherein the rearward portion of the frame member is formed by a mold having a front mold section and a rear mold section for forming the front section and the rear section of the rearward portion of the frame member, respectively, the front mold section having at least two mold portions that separate from one another in a lateral direction with respect to the rearward portion of the frame member, and the rear mold section having at least two mold portions that separate from one another in a vertical direction with respect to the rearward portion of the frame member.

16. The vehicle of claim 15, wherein the rearward portion of the frame member is formed by a vacuum die casting process.

17. The vehicle of claim 14, wherein the front section of the rearward portion of the frame member includes a plurality of reinforcing ribs extending between opposing side walls of the at least one channel-shaped member.

18. The vehicle of claim 14, additionally comprising a lower frame portion removeably coupled to the frame member, the lower frame portion being spaced below the frame member and supporting at least one component of the vehicle generally between the frame member and the lower frame portion.

* * * * *

UNITED STATES PATENT AND TRADEMARK OFFICE
CERTIFICATE OF CORRECTION

PATENT NO. : 6,889,788 B2  Page 1 of 1
DATED : May 10, 2005
INVENTOR(S) : Hakamata et al.

It is certified that error appears in the above-identified patent and that said Letters Patent is hereby corrected as shown below:

Column 13,
Line 14, after "swingarm" insert -- pivotally --.
Line 15, after "supporting" insert -- the --.
Line 20, delete "footrests" and insert -- footrest --.

Signed and Sealed this

Second Day of May, 2006

JON W. DUDAS
*Director of the United States Patent and Trademark Office*